(12) United States Patent
Baijal et al.

(10) Patent No.: US 11,748,594 B2
(45) Date of Patent: Sep. 5, 2023

(54) ELECTRONIC APPARATUS AND CONTROL METHOD THEREOF

(71) Applicant: SAMSUNG ELECTRONICS CO., LTD., Suwon-si (KR)

(72) Inventors: Anant Baijal, Suwon-si (KR); Jeongrok Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 290 days.

(21) Appl. No.: 17/036,524

(22) Filed: Sep. 29, 2020

(65) Prior Publication Data
US 2021/0125027 A1    Apr. 29, 2021

(30) Foreign Application Priority Data
Oct. 23, 2019    (KR) .................. 10-2019-0132439

(51) Int. Cl.
*G10L 15/00*    (2013.01)
*G06N 3/04*    (2023.01)
(Continued)

(52) U.S. Cl.
CPC ............. *G06N 3/04* (2013.01); *G06F 3/165* (2013.01); *G10L 21/10* (2013.01)

(58) Field of Classification Search
CPC ........... G06N 3/04; G06F 3/165; G10L 21/10; G10L 21/003; G10H 2210/031
See application file for complete search history.

(56) References Cited

U.S. PATENT DOCUMENTS 9,377,990 B2    6/2016  Johnston
10,068,557 B1 *  9/2018  Engel ............... G06N 3/045
(Continued)

FOREIGN PATENT DOCUMENTS

CN    106847294 A    6/2017
CN    108010538 A    5/2018
(Continued)

OTHER PUBLICATIONS

Y. Gao, R. Singh and B. Raj, "Voice Impersonation Using Generative Adversarial Networks," 2018 IEEE International Conference on Acoustics, Speech and Signal Processing (ICASSP), 2018, pp. 2506-2510, doi: 10.1109/ICASSP.2018.8462018. (Year: 2018).*
(Continued)

*Primary Examiner* — Bhavesh M Mehta
*Assistant Examiner* — Uthej Kunamneni
(74) *Attorney, Agent, or Firm* — Sughrue Mion, PLLC

(57) ABSTRACT

An electronic apparatus, including a memory configured to store a first artificial intelligence model; and a processor connected to the memory and configured to: based on receiving an input audio signal, obtain an input frequency spectrum image representing a frequency spectrum of the input audio signal, input the input frequency spectrum image to the first artificial intelligence model, obtain an output frequency spectrum image from the first artificial intelligence model, obtain an output audio signal based on the output frequency spectrum image, wherein the first artificial intelligence model is trained based on a target learning image, and wherein the target learning image represents a target frequency spectrum of a specific style, and is obtained from a second artificial intelligence model based on a random value.

16 Claims, 10 Drawing Sheets

(51) Int. Cl.
*G06F 3/16* (2006.01)
*G10L 21/10* (2013.01)

(56) References Cited

U.S. PATENT DOCUMENTS

| | | | |
|---|---|---|---|
| 10,192,163 B2 * | 1/2019 | Wang | H04N 1/00204 |
| 10,304,477 B2 | 5/2019 | van den Oord et al. | |
| 2015/0205570 A1 * | 7/2015 | Johnston | G06F 3/04842 |
| | | | 715/727 |
| 2018/0276540 A1 * | 9/2018 | Xing | G06N 3/084 |
| 2021/0005180 A1 | 1/2021 | Kim | |

FOREIGN PATENT DOCUMENTS

| | | |
|---|---|---|
| JP | 6-186958 A | 7/1994 |
| JP | 3623820 B2 | 2/2005 |
| KR | 10-1915120 B1 | 11/2018 |
| WO | 2019/182346 A1 | 9/2019 |

OTHER PUBLICATIONS

J. Hall, W. O'Quinn and R. J. Haddad, "An Efficient Visual-Based Method for Classifying Instrumental Audio using Deep Learning," 2019 SoutheastCon, 2019, pp. 1-4, doi: 10.1109/SoutheastCon42311.2019.9020571. (Year: 2019).*

Communication dated Apr. 7, 2021, from the European Patent Office in European Application No. 20202134.1.

Justin Hall et al., "An Efficient Visual-Based Method for Classifying Instrumental Audio using Deep Learning", IEEE, Apr. 11, 2019, pp. 1-4 (4 pages total).

Peerapol Khunarsa, "Single-signal entity approach for sung word recognition with artificial neural network and time-frequency audio features", The Journal of Engineering, Jul. 24, 2017, pp. 1-12 (12 pages total).

* cited by examiner

100

ELECTRONIC APPARATUS AND CONTROL METHOD THEREOF

CROSS-REFERENCE TO RELATED APPLICATION

This application is based on and claims priority under 35 U.S.C. § 119 to Korean Patent Application No. 10-2019-0132439, filed on Oct. 23, 2019, in the Korean Intellectual Property Office, the disclosure of which is incorporated by reference herein in its entirety.

BACKGROUND

1. Field

The disclosure relates to an electronic apparatus and a control method thereof, and more specifically to an electronic apparatus which processes an audio signal using an artificial intelligence model and a control method thereof.

2. Description of Related Art

Electronic apparatuses may provide a variety of experiences by using neural network technologies such as deep learning. In particular, functions such as segmentation, super-resolution, HDR, and the like are being improved by using neural network technologies. However, current neural network technologies are focused on image processing, and research on audio signal processing are insufficient. In particular, unlike an image, a sound of an audio signal is difficult to verify by eye and intuitively applying neural network technology is difficult.

Accordingly, there is a need to develop a more intuitive and efficient method in the processing of audio signals by using neural network technology.

SUMMARY

Provided are an electronic apparatus for processing audio signals in various styles by using a conventional artificial intelligence model and a control method thereof.

In accordance with an aspect of the disclosure, an electronic apparatus includes a memory configured to store a first artificial intelligence model; and a processor connected to the memory and configured to: based on receiving an input audio signal, obtain an input frequency spectrum image representing a frequency spectrum of the input audio signal, input the input frequency spectrum image to the first artificial intelligence model, obtain an output frequency spectrum image from the first artificial intelligence model, obtain an output audio signal based on the output frequency spectrum image, wherein the first artificial intelligence model is trained based on a target learning image, and wherein the target learning image represents a target frequency spectrum of a specific style, and is obtained from a second artificial intelligence model based on a random value.

The target learning image may be obtained from the second artificial intelligence model based on the random value and a condition value corresponding to the specific style, and the second artificial intelligence model may be trained to obtain a plurality of target learning images representing a plurality of target frequency spectrums of a plurality of styles based on a plurality of condition values corresponding to the plurality of styles.

The memory may be further configured to store a plurality of first artificial intelligence models, the plurality of first artificial intelligence models may be trained based on different target learning images, and the different target learning images may be obtained from the second artificial intelligence model.

The different target learning images may be obtained by modifying a weight value of at least one layer from among a plurality of layers included in the second artificial intelligence model.

The modified weight value may be obtained by multiplying a feature vector with the weight value of the at least one layer.

The first artificial intelligence model may include a Convolutional Neural Network (CNN), and the second artificial intelligence model may include a Generative Adversarial Network (GAN).

The specific style may be classified according to at least one from among a type of instrument, a type of emotion, or a processing method of an image.

The processor may be further configured to divide the input audio signal into a plurality of sections having a predetermined length, obtain a plurality of input frequency spectrum images representing a plurality of frequency spectrums corresponding to the plurality of sections, input the plurality of input frequency spectrum images to the first artificial intelligence model, obtain a plurality of output frequency spectrum images from the first artificial intelligence model, obtain a final output image by stitching the plurality of output frequency spectrum images, and obtain the output audio signal based on the final output image.

The processor may be further configured to obtain the input frequency spectrum image from the input audio signal using a Fast Fourier Transformation (FFT), and obtain the output audio signal from the output frequency spectrum image using an Inverse Fast Fourier Transformation (IFFT).

In accordance with an aspect of the disclosure, a control method of an electronic apparatus includes based on receiving an input audio signal, obtaining an input frequency spectrum image representing a frequency spectrum of the input audio signal; inputting the input frequency spectrum image to a first artificial intelligence model stored in the electronic apparatus; obtaining an output frequency spectrum image from the first artificial intelligence model; and obtaining an output audio signal based on the output frequency spectrum image, wherein the first artificial intelligence model is trained based on a target learning image, and wherein the target learning image represents a target frequency spectrum of a specific style, and is obtained from a second artificial intelligence model based on a random value.

The target learning image may be obtained from the second artificial intelligence model based on the random value and a condition value corresponding to the specific style, and the second artificial intelligence model may be trained to obtain a plurality of target learning images representing a plurality of target frequency spectrums of each of a plurality of styles based on a plurality of condition values corresponding to the plurality of styles.

The electronic apparatus may store a plurality of first artificial intelligence models, the plurality of first artificial intelligence models may be trained based on different target learning images, and wherein the different target learning images may be obtained from the second artificial intelligence model.

The different target learning images may be obtained by modifying a weight value of at least one layer from among a plurality of layers included in the second artificial intelligence model.

The modified weight value may be obtained by multiplying a feature vector with the weight value of the at least one layer.

The first artificial intelligence model may include a Convolutional Neural Network (CNN), and the second artificial intelligence model may include a Generative Adversarial Network (GAN).

The specific style may be classified according to at least one from among a type of instrument, a type of emotion, or a processing method of an image.

The control method may further include dividing the input audio signal into a plurality of sections having a predetermined length; obtaining a plurality of input frequency spectrum images representing a frequency spectrums corresponding to the plurality of sections; inputting the plurality of input frequency spectrum images to the first artificial intelligence model; obtaining a plurality of output frequency spectrum images from the first artificial intelligence model; obtaining a final output image by stitching the plurality of output frequency spectrum images; and obtaining the output audio signal based on the final output image.

The control method may further include obtaining the input frequency spectrum image from the input audio signal using a Fast Fourier Transformation (FFT), and obtaining the output audio signal from the output frequency spectrum image using an Inverse Fast Fourier Transformation (IFFT).

In accordance with an aspect of the disclosure, a non-transitory computer readable recording medium is configured to store instructions which, when executed by at least one processor of an electronic apparatus, causes the at least one processor to: based on receiving an input audio signal, obtain an input frequency spectrum image representing a frequency spectrum of an audio signal; input the input frequency spectrum image to a first artificial intelligence model stored in the electronic apparatus; obtain an output frequency spectrum image from the first artificial intelligence model; and obtain an output audio signal based on the output frequency spectrum image, wherein the first artificial intelligence model is trained based on a target learning image, and wherein the target learning image represents a target frequency spectrum of a specific style, and is obtained from a second artificial intelligence model based on a random value.

The first artificial intelligence model may include a Convolutional Neural Network (CNN), and the second artificial intelligence model may include a Generative Adversarial Network (GAN).

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
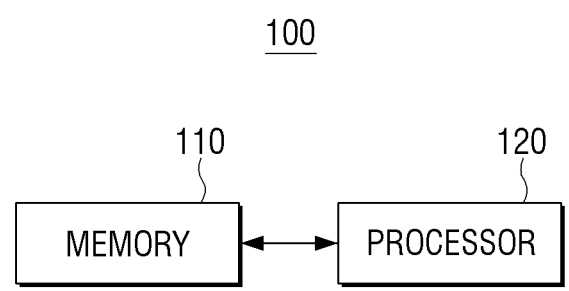
FIG. 1 is a block diagram illustrating a configuration of an electronic apparatus according to an embodiment.

Exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail because they may obscure the disclosure with unnecessary detail.

The terms used to describe embodiments of the disclosure are general terms selected that are currently widely used considering their function. However, terms may change depending on intention, legal or technical interpretation, emergence of new technologies, and the like of those skilled in the related art. Further, in certain cases, some terms may be arbitrarily selected, and, in which case the meaning of the term will be explained in greater detail in the corresponding description. Accordingly, the terms used herein are not to be construed simply as their designation but instead based on their meaning and the overall context of the disclosure.

Expressions such as "comprise," "may comprise," "include," or "may include" used herein are to be understood as designating a presence of a characteristic (e.g., elements such as a number, a function, an operation, or a component), and do not exclude the presence of an additional characteristic.

The expression at least one of A and/or B should be understood to represent "A" or "B" or any one of "A and B."

Expressions such as "first," "second," "1st," "2nd," and the like used herein may be used to refer to various elements regardless of order and/or importance. Further, it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it should be understood that a certain element may be directly coupled to another element or coupled through still another element (e.g., third element).

A singular expression includes a plural expression, unless otherwise specified. It is to be understood that the terms such as "include" or "comprised of" are used herein to designate a presence of a characteristic, number, step, operation, element, component, or a combination thereof, and not to preclude a presence or a possibility of adding one or more of other characteristics, numbers, steps, operations, elements, components or a combination thereof.

Terms such as "module" or "part" in the disclosure are used to refer to an element that performs at least one function or operation, and may be implemented as hardware or software, or a combination of a hardware and software. Further, except for a "module" or "part" that needs to be implemented as a particular hardware, a plurality of "modules" or a plurality of "parts" may be integrated into at least one module and implemented as at least one processor.

In the disclosure, the term "user" may refer to a person using an electronic apparatus or an apparatus (e.g., an artificial intelligence electronic apparatus) using an electronic apparatus.

Embodiments of the disclosure will be described in greater detail below with reference to the drawings FIG. 1 is a block diagram illustrating a configuration of an electronic apparatus according to an embodiment of the disclosure.

Referring to FIG. 1, the electronic apparatus 100 may include a memory 110 and a processor 120.

The electronic apparatus 100 may be an apparatus which stores an artificial intelligence model and processes an audio signal through the stored artificial intelligence model. For example, the electronic apparatus 100 may be implemented as a device of various forms such as, for example and without limitation, a user terminal apparatus, a display apparatus, a set-top box, a tablet personal computer (PC), a smart phone, an e-book reader, a desktop PC, a laptop PC, a workstation, a server, a personal digital assistant (PDA), a portable multimedia player (PMP), an MP3 player, or the like. However, this is merely one embodiment, and the electronic apparatus 100 may also be a device such as, for example and without limitation, a navigation device, a vehicle infotainment device, various medical devices, internet of things device, or the like, and may be any device.

The memory 110 may store various programs and data used in the operation of the electronic apparatus 100. For example, the memory 110 may store an operating system (OS) and application programs executable on the OS.

The memory 110 may store at least one first artificial intelligence model. For example, the memory 110 may store a first artificial intelligence model to convert an audio signal of a piano being played to an audio signal of a violin being played. That is, the first artificial intelligence model may be a model for changing the tone by changing the instrument from a piano to a violin, while maintaining the key and beat of the audio signal. However, the above is merely one embodiment, and the memory 110 may store a first artificial intelligence model of various types. The first artificial intelligence model may be a model which receives input of an image representing a frequency spectrum of an audio signal, and outputs a converted image. In embodiments, an image representing a frequency spectrum may also be referred to as a frequency spectrum image. An example of a conversion relationship between the audio signal and the image will be described below.

The memory 110 may be implemented as a non-volatile memory, a volatile memory, a flash-memory, a hard disk drive (HDD), a solid state drive (SSD), a memory card mounted to the electronic apparatus 100 (e.g., micro SD card, memory stick), or the like, and the OS and application programs may be stored in the memory 110 based on an operation of a manufacturer or user of the electronic apparatus 100.

The processor 120 may be configured to control an overall operation of the electronic apparatus 100. In particular, the processor 120 may be configured to control the overall operation of the electronic apparatus 100 by being coupled to each configuration of the electronic apparatus 100. For example, the processor 120 may be coupled with the memory 110 and may control the operation of the electronic apparatus 100.

According to an embodiment, the processor 120 may be implemented as a digital signal processor (DSP), a microprocessor, and a time controller (T-CON). However, the embodiment is not limited thereto, and the processor 120 may include one or more from among a central processing unit (CPU), a micro controller unit (MCU), a micro processing unit (MPU), a controller, an application processor (AP), a communication processor (CP), or an ARM processor, or may be defined by the corresponding term. In addition, the processor 120 may be implemented as a system on chip (SoC) with a built-in processing algorithm and as a large scale integration (LSI), or in a field programmable gate array (FPGA) form.

The processor 120 may be configured to, based on an audio signal being input, obtain an image representing a frequency signal of an audio signal. For example, the processor 120 may be configured to obtain an image from or based on the audio signal through a Fast Fourier Transformation (FFT). However, embodiments are not limited thereto.

The processor 120 may be configured to input the obtained image to the first artificial intelligence model, and obtain an output audio signal based on the image output from the first artificial intelligence model. For example, the processor 120 may be configured to obtain an output audio signal from the image output through an Inverse Fast Fourier Transformation (IFFT). However, embodiments are not limited thereto. The first artificial intelligence model may be a trained model based on a target learning image, and the target learning image may be an image obtained from a second artificial intelligence model which is trained to obtain an image representing a frequency spectrum of a specific style based on a random value.

The second artificial intelligence model may be trained to obtain an image representing a frequency spectrum of a specific style, and a target learning image may be obtained by inputting a random value to the second artificial intelligence model. The target learning image obtained in this method may represent a form of a specific style. For example, the second artificial intelligence model may learn a plurality of images representing a frequency spectrum of an audio signal of a piano being played, and generate the frequency spectrum of the audio signal of a piano being played by receiving input of a random value.

The second artificial intelligence model may be implemented as a Generative Adversarial Network (GAN). The GAN may include a generator G which generates a virtual data sample and a discriminator D which discriminates whether the input data sample is an actual data or not. The GAN may refer to a machine learning model built through adversarial training between the generator and the discriminator. The generator G may be a model trained to minimize a difference between a generated image by the generator G and a target image, for example a frequency spectrum of an audio signal of an actual piano being played. The discriminator D may be a model which identifies a difference value between the image generated by the generator G and the target image. Through the above-described process, the second artificial intelligence model may output an image representing a frequency spectrum of a specific style.

The first artificial intelligence model may be a model trained based on the target learning image, and may be a model which teamed the relationship between each of a plurality of sample images representing a frequency spectrum and a target learning image. For example, the first artificial intelligence model may be implemented as a Convolutional Neural Network (CNN), and the first artificial intelligence model may compare a result output by inputting each of the plurality of sample images and the target learning image, and may be updated based on the comparison result. The plurality of sample images may include images representing a frequency spectrum of various styles such as, for example and without limitation, an image representing a frequency spectrum of an audio signal of a piano being played, an image representing a frequency spectrum of an audio signal of a violin being played, and the like.

That is, the first artificial intelligence model may be a model trained to output a similar result with the target learning image used in the training process (or learning process) even if an image representing an arbitrary frequency spectrum is input.

The above-described training process may also be performed in the electronic apparatus 100, but may be performed in a separate apparatus such as a server.

Examples of the first artificial intelligence model and the second artificial intelligence model will be described below with reference to the drawings.

The target learning image may be an image obtained from the second artificial intelligence model based on a random value and a condition value corresponding to the specific style, and the second artificial intelligence model may be a model trained to obtain an image representing the frequency spectrum of each of a plurality of styles based on the condition value corresponding to the each of the plurality of styles.

For example, a first target learning image, as an image obtained from the second artificial intelligence model based on a random value and a condition value of 1, may be a learning image for converting to a piano style, and a second target learning image, as an image obtained from the second artificial intelligence model based on a random value and a condition value of 2, may be a learning image for converting to a violin style. Further, the second artificial intelligence model may be a model trained to obtain an image representing a frequency spectrum of a piano style and a frequency spectrum of a violin style based on the condition value corresponding to each of the piano style and the violin style.

That is, the second artificial intelligence model may be a model trained to output a plurality of target learning images according to conditioning of the training process.

In an embodiment, the memory 110 may store a plurality of first artificial intelligence models, and each of the plurality of first artificial intelligence models may be a model trained based on a different target learning image, and each of the different target learning images may be an image obtained from the at least one second artificial intelligence model.

That is, the second artificial intelligence model may be a plurality of artificial intelligence models according to style without conditioning. For example, the second artificial intelligence model may include an artificial intelligence model trained to obtain a learning image for converting to a piano style and an artificial intelligence model trained to obtain a learning image for converting to a violin style.

Each of the target learning images from among the different target learning images may be obtained by changing a weight value of at least one layer from among a plurality of layers included in the at least one second artificial intelligence model. For example, the weight value of the modified at least one layer may be obtained by multiplying a feature vector by the weight value of the at least one layer.

The feature vector in the training process of the second artificial intelligence model may be trained as a part of the second artificial intelligence model.

In the above, a specific style has been described as corresponding to or representing an instrument such as piano or a violin, but this is merely one embodiment, and the specific style may be divided according to at least one from among a type of instrument, a type of emotion, or a processing method of an image. The type of instrument referred herein may include not only the piano and the violin, but also various string instruments, wind instruments, percussion instruments, and the like. Further, the type of emotion may include various emotions such as joy, sadness, happiness, and loneliness.

The processing method of an image may include various methods, such as a method of up-scaling an image, a method of removing noise from an image, a method of identifying an object from an image, and the like. For example, the processing method of an image may be a method of up-scaling an image representing a frequency spectrum of an audio signal, which may enhance the quality of the audio signal through the processing described above.

In the above, the audio signal itself has been described as being converted to an image representing a frequency spectrum of an audio signal for convenience of description, but in practice, the audio signal may be of various forms based on the playback time, and the like. Accordingly, the processor 120 may be configured to divide the audio signal to a plurality of sections, and may convert each of the plurality of sections.

The processor 120 may be configured to divide the audio signal to a plurality of sections of a predetermined length, obtain a plurality of images representing a frequency spectrum of each of the plurality of sections, input each of the plurality of images to the first artificial intelligence model, obtain a final image by stitching the images output from the first artificial intelligence model, and obtain an output audio signal based on the final image.

In addition, the processor 120 may be configured to, after stitching the output images, use a filter to enhance a continuity of a stitched point.

In an embodiment, the processor 120 may be configured to divide an audio signal to a plurality of sections of a predetermined length, obtain a plurality of images representing a frequency spectrum of each of the plurality of sections, input each of the plurality of images to the first artificial intelligence model, obtain a plurality of output audio signals based on the image output from the first artificial intelligence model, and obtain a final audio signal by joining a plurality of output audio signals.

A function related to the artificial intelligence according to an embodiment may be operated through the processor 120 and the memory 110.

The processor 120 may include one or a plurality of processors. The one or the plurality of processors may be a generic-purpose processor such as a CPU, an AP, or a digital signal processor (DSP), a graphics dedicated processor such as a GPU, or a vision processing unit (VPU), or an artificial intelligence dedicated processor such as an NPU.

The one or plurality of processors may process the input data according to a pre-defined operation rule or an artificial intelligence model stored in the memory. In an embodiment, if the one or the plurality of processors is an artificial intelligence dedicated processor, the artificial intelligence dedicated processor may be designed to a hardware structure specializing in the processing of a specific artificial intelligence model. The pre-defined operation rule or the artificial intelligence model may be characterized by being created through training or learning.

Being created through learning may mean that the pre-defined operation rule or an artificial intelligence model is created to perform a desired feature (or, purpose) because a basic artificial intelligence module is trained by a learning algorithm using a plurality of learning data. The learning may be carried out in the machine itself in which the artificial intelligence according to an embodiment is performed, or carried out through a separate server and/or system. Examples of the learning algorithm may include a supervised learning, a unsupervised learning, a semi-supervised learning, or a reinforcement learning, but the embodiment is not limited thereto.

The artificial intelligence model may include a plurality of neural network layers. The each of the plurality of neural network layers may include a plurality of weight values, and may perform neural network processing through processing between the processing results of a previous layer and the plurality of weight values. The plurality of weight values included in the plurality of neural network layers may be optimized by the learning result of the artificial intelligence model. For example, the plurality of weight values may be updated for a loss value or a cost value obtained by the artificial intelligence model during the training process to be reduced or optimized.

The artificial neural network may include a Deep Neural Network (DNN), and examples thereof may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Deep-Q Networks, or the like, but the embodiment is not limited to the above-described examples.

Through the above-described method, various artificial intelligence models which are used in conventional image processing may be used in the audio signal processing.

An example of an operation will be described in greater detail below through the drawings.

Figure 2A:
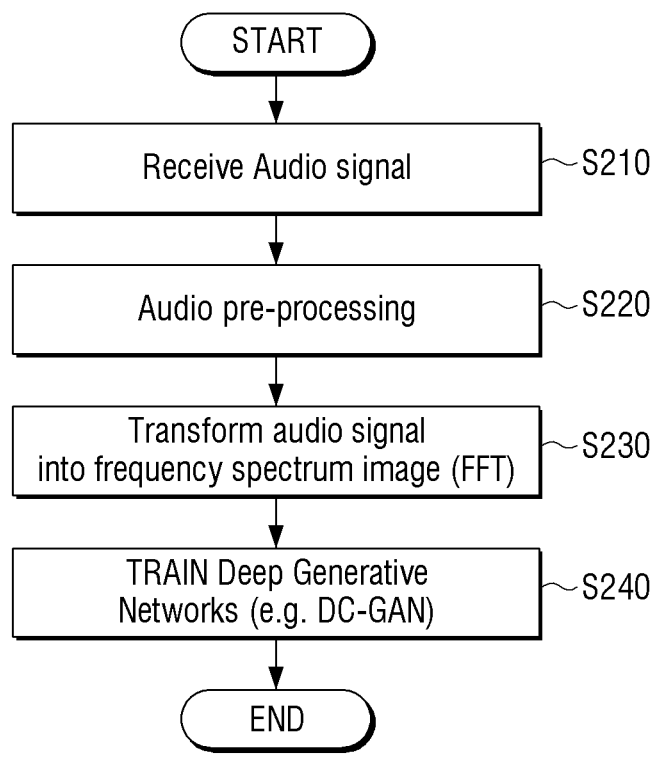
FIG. 2A is a diagram illustrating a training method of an artificial intelligence model according to an embodiment.
Figure 2B:
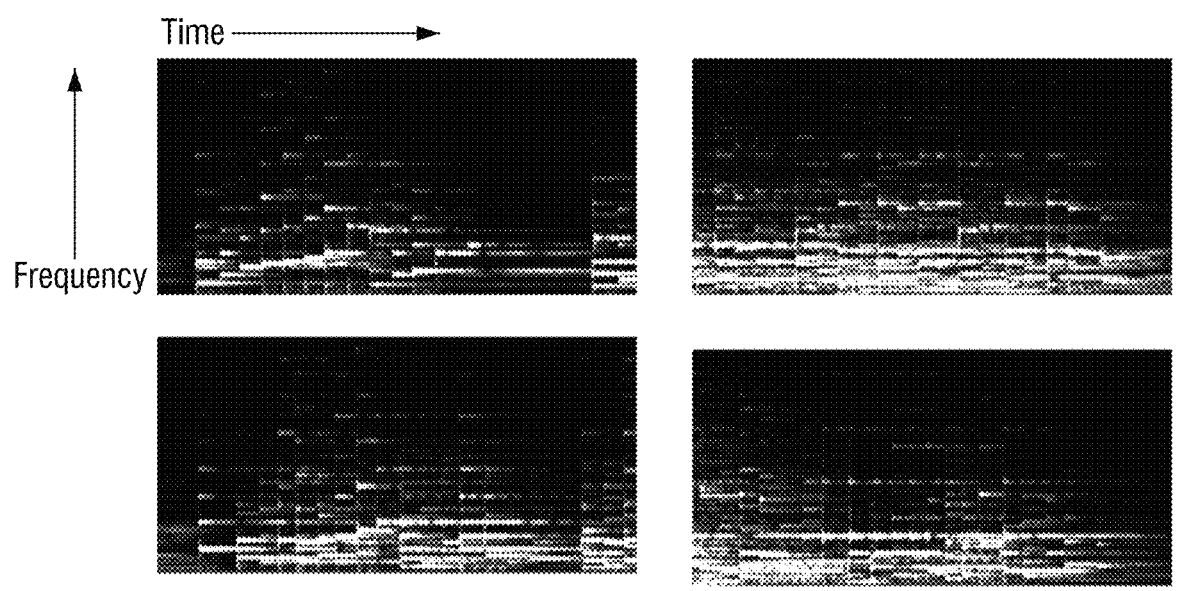
FIG. 2B is a diagram illustrating a training method of an artificial intelligence model according to an embodiment.
Figure 2C:
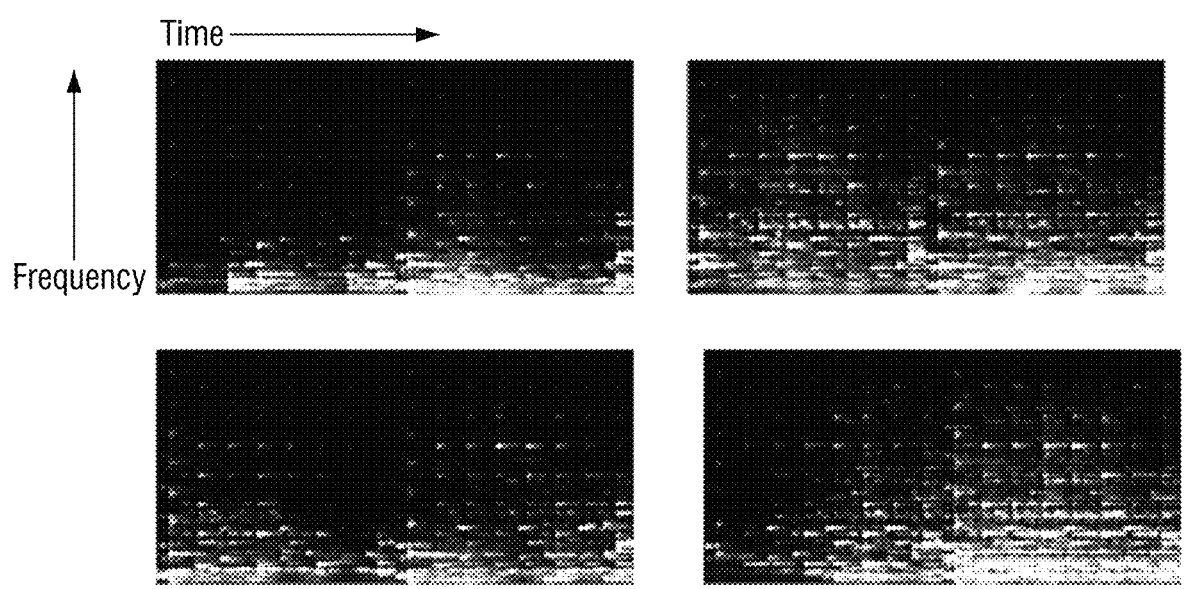
FIG. 2C is a diagram illustrating a training method of an artificial intelligence model according to an embodiment.

FIGS. 2A to 2C are diagrams illustrating a training method of an artificial intelligence model according to an embodiment of the disclosure. For convenience of description, the training operation of the first artificial intelligence model and the second artificial intelligence model is described below as being performed by the electronic apparatus 100.

As illustrated in FIG. 2A, processor 120 may be configured to receive an audio signal at operation S210. In an embodiment, the processor 120 may be configured to receive a plurality of audio signals. The plurality of audio signals may be an audio signal of a same style. For example, the plurality of audio signals may be an audio signal of a piano being played, and in FIGS. 2A to 2C, the second artificial intelligence model is described as being trained by using an audio signal of a piano being played for convenience of description.

However, the embodiment is not limited thereto, and the processor 120 may be configured to receive audio signals of various styles. In this case, the processor 120 may be configured to divide the audio signals per style in a pre-processing process, an example of which will be described below.

The processor 120 may be configured to pre-process the audio signal at operation S220. For example, the processor 120 may be configured to divide the audio signal to units of frames, chunks, and the like. That is, the processor 120 may be configured to divide the audio signal to a plurality of sections of a predetermined length.

The processor 120 may be configured to convert the each of the divided audio signals to an image representing a frequency spectrum at operation S230. FIG. 2B illustrates an example of images representing a frequency spectrum, where an x-axis represents time and a y-axis represents frequency.

Through the above-described method, the processor 120 may obtain the plurality of images to be used in the training of the second artificial intelligence model from the at least one audio signal.

The processor 120 may train the second artificial intelligence model by using the plurality of images representing the frequency spectrum at operation S240. The second artificial intelligence model may be implemented as a GAN. Specifically, the second artificial intelligence model may be implemented as a Deep Convolution (DC) GAN. The DC GAN may, as a technology in which a Deep Convolution is added to the GAN, be used in training by processing images.

That is, as described above, the second artificial intelligence model may learn the plurality of images through interoperation of the generator G and the discriminator D. As the learning is repeated, the generator G may be able to output an image with a feature of a frequency spectrum of a specific style that gradually stands out.

FIG. 2C illustrates an example of a frequency spectrum output from the second artificial intelligence model which has completed training, where an x-axis represents time and a y-axis represents frequency. The processor 120 may obtain an image as in FIG. 2C by inputting the random value to the second artificial intelligence model which has completed training.

In FIGS. 2A to 2C, the second artificial intelligence model has been described as being trained through an audio signal of a piano being played, but the processor 120 may be configured to train a plurality of second artificial intelligence models. For example, the processor 120 may be configured to train a first-second artificial intelligence model using an image representing a frequency spectrum of an audio signal of a piano being played, and train a second-second artificial intelligence model using an image representing a frequency spectrum of an audio signal of a violin being played. Then, the processor 120 may be configured to obtain a first target learning image from the first-second artificial intelligence model by inputting a random value, and obtain a second target learning image from the second-second artificial intelligence model by inputting a random value. The first target learning image may be a learning image for converting to a piano style, and the second target learning image may be a learning image for converting to a violin style.

In an embodiment, the processor 120 may be configured to perform training on a plurality of instruments through conditioning on the second artificial intelligence model. For example, the processor 120 may be configured to train the second artificial intelligence model using a condition value of 1 and an image representing a frequency spectrum of an audio signal of a piano being played, and train the second artificial intelligence model using a condition value of 2 and an image representing a frequency spectrum of an audio signal of a violin being played. Here, only one of the artificial intelligence models may be used. Thereafter, processor 120 may be configured to obtain the first target learning image from the second artificial intelligence model by inputting a condition value of 1 and a random value, and obtain the second target learning image from the second artificial intelligence mode by inputting a condition value of 2 and a random value. The first target learning image may be a learning image for converting to a piano style, and the second target learning image may be a learning image for converting to a violin style.

As another conditioning method, the processor 120 may be configured to multiply the feature vector with at least one layer from among the plurality of layers included in the second artificial intelligence model, and obtain a second artificial intelligence model with the weight value of the at least one layer modified. The processor 120 may be configured to perform learning on the plurality of instruments by using a plurality of feature vectors. For example, the processor 120 may obtain a first-second artificial intelligence model with the weight value of the first layer modified by multiplying a first feature vector to the first layer from among the plurality of layers included in the second artificial intelligence model, train the first-second artificial intelligence model using the audio signal of a piano being played, obtain a second-second artificial intelligence model with the weight value of the second layer modified by multiplying the second feature vector to the second layer from among the plurality of layers included in the second artificial intelligence model, and train the second-second artificial intelligence model using the audio signal of a violin being played. Then, the processor 120 may be configured to obtain the first target learning image from the first-second artificial intelligence model by inputting the random value, and obtain the second target learning image from the second-second artificial intelligence model by inputting the random value. The first target learning image may be a learning image for converting to a piano style, and the second target learning image may be a learning image for converting to a violin style.

Based on the above-described method, the processor 120 may be configured to obtain the plurality of target learning images. The processor 120 may be configured to train the plurality of first artificial intelligence models based on each of the plurality of target learning images. For example, the processor 120 may be configured to obtain a first-first artificial intelligence model by learning the relationship between the each of the plurality of sample images representing the frequency spectrum and the first target learning image, and obtain second-first artificial intelligence model by learning the relationship between the each of the plurality of sample images representing the frequency spectrum and the second target learning image. That is, a number of the plurality of first artificial intelligence models may be the same as with the number of the plurality of target learning images.

As described above, the processor 120 may train the first artificial intelligence mode and the second artificial intelligence model.

In the above, the electronic apparatus 100 has been described as performing a training operation of the first artificial intelligence model and the second artificial intelligence model, but the embodiment is not limited thereto. For example, the server may be configured to train the second artificial intelligence model, obtain at least one target learning image from the second artificial intelligence model, train the at least one first artificial intelligence model corresponding to the at least one target learning image, and provide the at least one first artificial intelligence model to the electronic apparatus 100. In an embodiment, the server may be configured to train the second artificial intelligence model, obtain the at least one target learning image from the second artificial intelligence model, and provide the at least one target learning image to the electronic apparatus 100, and the electronic apparatus 100 may also be configured to train the at least one first artificial intelligence model corresponding to the at least one target learning image.

Figure 3:
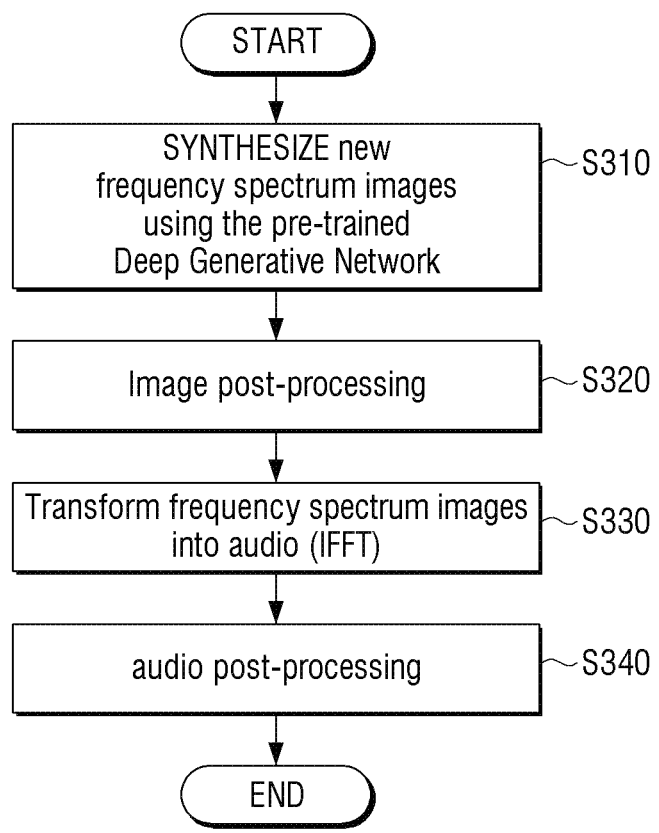
FIG. 3 is a flowchart illustrating a method of processing an image representing a frequency spectrum of an audio signal according to an embodiment.

FIG. 3 is a flowchart illustrating a method of processing an image representing a frequency spectrum of an audio signal according to an embodiment of the disclosure.

The processor 120 may be configured to synthesize a plurality of target learning images from the at least one second artificial intelligence model which has completed training at operation S310. For example, the processor 120 may be configured to obtain the plurality of target learning images by inputting a random value to each of the plurality of second artificial intelligence models. In an embodiment, the processor 120 may be configured to perform conditioning on the second artificial intelligence model and obtain a plurality of target learning images by inputting a random value.

The processor 120 may be configured to perform an image processing on an image representing a frequency spectrum of an audio signal at operation S320. For example, the processor 120 may be configured to perform image processing on an image representing the frequency spectrum of the audio signal by using the first artificial intelligence model trained based on the target learning image for converting to a piano style. In this case, the image representing the frequency spectrum of the audio signal may be converted to an image of a piano style.

However, the embodiment is not limited thereto, and the processor 120 may be configured to perform image processing on the image representing the frequency spectrum of the audio signal by using the first artificial intelligence model for performing operations such as converting an image style, removing image noise, synthesizing an image, extracting an object, and removing an object.

The processor 120 may be configured to obtain an output audio signal based on an image output from the first artificial intelligence model at operation S330. For example, the processor 120 may be configured to obtain the output audio signal from an image modified to a piano style through IFFT. That is, the processor 120 may be configured to obtain the output audio signal from the image through IFFT with a phase reconstruction, and the phase reconstruction may be performed using signal processing algorithms such as Griffin-Lim algorithm. However, the embodiment is not limited thereto, and an artificial intelligence model may be used to perform the phase reconstruction, and there are no specific limitations to the phase reconstruction method.

The processor 120 may be configured to post-process the output audio signal at operation S340. For example, the processor 120 may be configured to perform noise removal of the output audio signal or signal processing to enhance quality.

Figure 4:
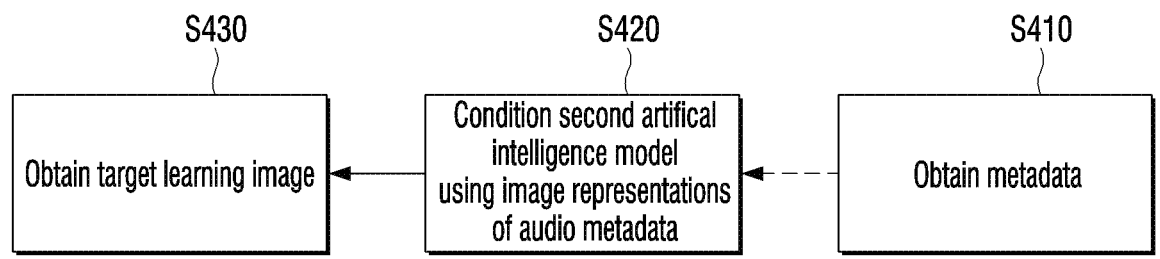
FIG. 4 is a diagram illustrating a method of obtaining a target learning image through conditioning according to an embodiment.

FIG. 4 is a diagram illustrating a method of obtaining a target learning image through conditioning according to an embodiment of the disclosure.

First, the processor 120 may be configured to obtain at least one second artificial intelligence model through the method of FIG. 2. The at least one second artificial intelligence model may be in a state in which the training has been completed.

FIG. 4 is a diagram for describing the conditioning of obtaining the plurality of target learning images from the one second artificial intelligence model. The one second artificial intelligence model used in FIG. 4 may be a model with the training having been performed with an image corresponding to each of the plurality of styles.

For example, at operation S410 the processor 120 may obtain metadata including one or more condition values. At operation S420, the processor 120 may be configured to train the second artificial intelligence model through a condition value of 1 and an image of a first style, and train the second artificial intelligence model through a condition value of 2 and an image of a second style. Thereafter, at operation S430 the processor 120 may be configured to obtain the first target learning image corresponding to the first style from the second artificial intelligence model by inputting the condition value of 1 and a random value, and obtain the second target learning image corresponding to the second style from the second artificial intelligence model by inputting the condition value of 2 and a random value. The condition value may correspond to at least one from among a genre, an instrument or an emotion of the audio signal.

In an embodiment, at operation S410 the processor 120 may obtain metadata including one or more feature values. At operation S420, the processor 120 may be configured to obtain the first-second artificial intelligence model with the weight value of the first layer modified by multiplying the first feature vector to the first layer from among the plurality of layers included in the second artificial intelligence model, train the first-second artificial intelligence model using an image of the first style, obtain the second-second artificial intelligence model with the weight value of the second layer modified by multiplying the second feature vector to the second layer from among the plurality of layers included in the second artificial intelligence model, and train the second-second artificial intelligence model through an image of the second style. The feature vector may b correspond to at least one from among a genre, an instrument or an emotion of the audio signal.

Figure 5:
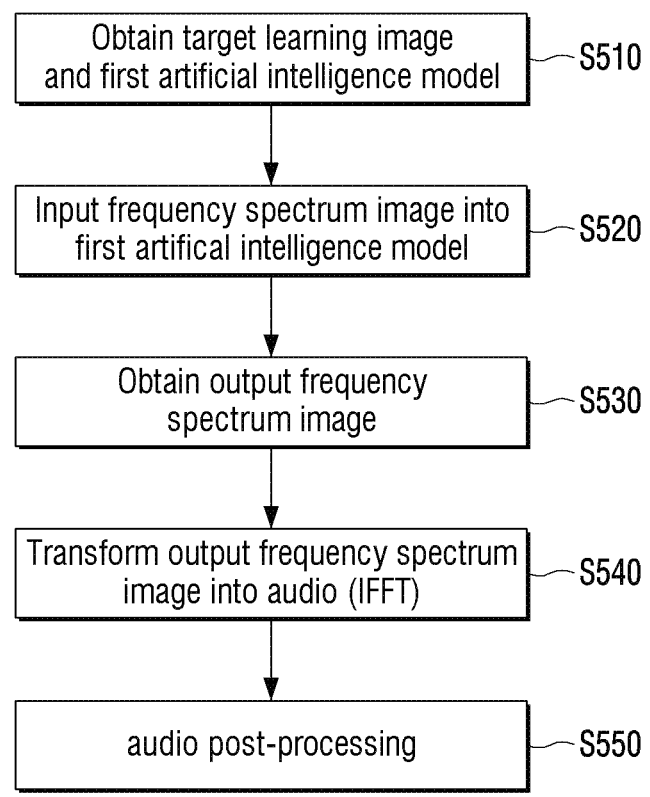
FIG. 5 is a diagram illustrating an audio processing method according to various embodiments.
Figure 6:
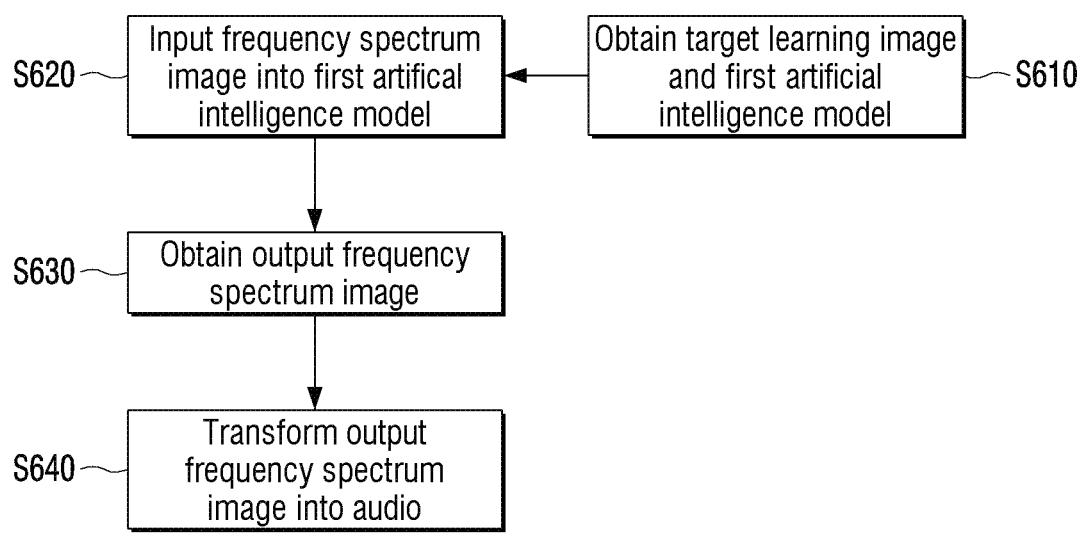
FIG. 6 is a diagram illustrating an audio processing method according to various embodiments.

FIGS. 5 and 6 are diagrams illustrating audio processing methods according to various embodiments of the disclosure.

The processor 120 may be configured to, as illustrated in FIG. 5, obtain a target learning image corresponding to a first emotion and the first artificial intelligence model trained based on the target learning image at operation S510. Then, the processor 120 may be configured to input the image representing the frequency spectrum of the audio signal corresponding to a second emotion to the first artificial intelligence model at operation S520, obtain an output frequency spectrum image from the first artificial intelligence model at operation S530, and obtain the output audio signal based on the image output from the first artificial intelligence model at operation S540, for example using IFFT. In an embodiment, audio post-processing may also be performed at operation S550.

For example, the processor 120 may be configured to obtain a target learning image corresponding to sadness and the first artificial intelligence model trained based on the target learning image at operation S510. Then, the processor 120 may be configured to input the image representing the frequency spectrum of the audio signal corresponding to joy to the first artificial intelligence model at operation S520, and obtain an output audio signal at operation S540 based on the image output from the first artificial intelligence model at operation S530. The output audio signal may having a more sad ambience than the initial audio signal.

In an embodiment, the processor 120 may be configured to, as illustrated in FIG. 6, obtain a target learning image corresponding to the first style and the first artificial intelligence model trained based on the target learning image at operation S610. Then, the processor 120 may be configured to input the image representing the frequency spectrum of the audio signal corresponding to the second style to the first artificial intelligence model at operation S620, obtain an output frequency spectrum image from the first artificial intelligence model at operation S630, and obtain the output audio signal at operation S640 based on the image output from the first artificial intelligence model.

For example, the processor 120 may be configured to obtain a target learning image corresponding to a rock style and the first artificial intelligence model trained based on the target learning image at operation S610. Then, the processor 120 may input the image representing the frequency spectrum of the audio signal corresponding to a classical style to the first artificial intelligence model at operation S620, and obtain an output audio signal at operation S640 based on the image output from the first artificial intelligence model at operation S630. The output audio signal may be a signal added with a rock style based on the initial audio signal.

In FIGS. 5 and 6, examples have been provided with emotion and genre, respectively, but other examples may also be possible. For example, the processor 120 may be configured to, through the methods of FIGS. 5 and 6, perform at least one from among a change in instrument, a change in performing style, or a change in tone of a singer.

Figure 7:
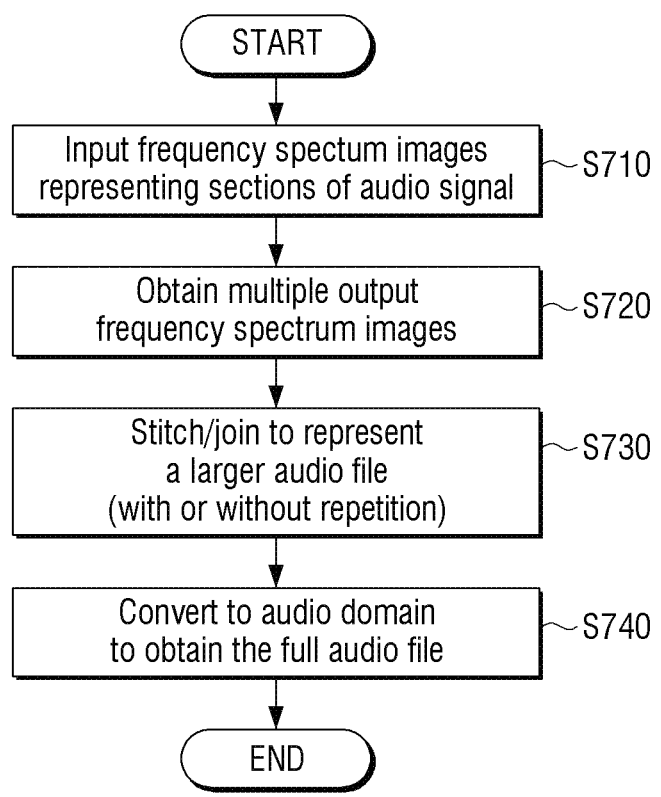
FIG. 7 is a flowchart illustrating a method of processing an entire audio signal according to an embodiment.

FIG. 7 is a flowchart illustrating a method of processing an entire audio signal according to an embodiment of the disclosure.

The processor 120 may be configured to divide the audio signal to a plurality of sections of a predetermined length, obtain a plurality of images representing the frequency spectrum of each of the plurality of sections, and input each of the plurality of images to the first artificial intelligence model at operation S710.

Then, the processor 120 may be configured to obtain images output sequentially from the first artificial intelligence model S720. The processor 120 may be configured to obtain a final image by stitching the images output sequentially from the first artificial intelligence model at operation S730.

The processor 120 may be configured to obtain the output audio signal by converting the final image to an audio domain S740.

Through the above-described operation, the processor 120 may solve the problem of being overloaded because the processor no longer has to process the entire audio signal at once. In addition, the processing of the audio signal per section may be advantageous in streaming, and advantageous in parallel processing in some cases.

Figure 8:
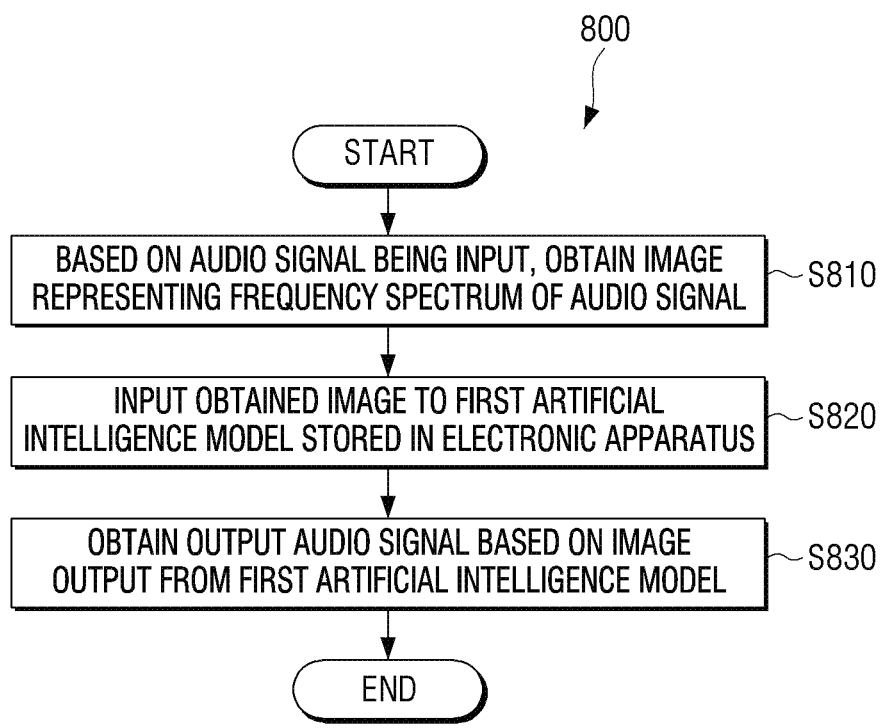
FIG. 8 is a flowchart illustrating a control method of an electronic apparatus according to an embodiment.

FIG. 8 is a flowchart illustrating a control method 800 of an electronic apparatus according to an embodiment of the disclosure.

First, based on the audio signal being input, an image representing a frequency spectrum of an audio signal may be obtained at operation S810. Then, the obtained image may be input to the first artificial intelligence model stored in the electronic apparatus at operation S820. Then, an output audio signal may be obtained based on the image output from the first artificial intelligence model at operation S830. The first artificial intelligence model may be a model trained based on the target learning image, and the target learning image may be an image obtained from the second artificial intelligence model trained to obtain an image representing a frequency spectrum of a specific style based on a random value.

In addition, the target learning image may be an image obtained from the second artificial intelligence model based on a random value and a condition value corresponding to the specific style, and the second artificial intelligence model may be a model trained to obtain the image representing the frequency spectrum of each of the plurality of styles based on the condition value corresponding to each of the plurality of styles.

The electronic apparatus may store a plurality of first artificial intelligence models, the each of the plurality of first artificial intelligence models may be a model trained based on different target learning images, and each of the different target learning images may be an image obtained from the at least one second artificial intelligence model.

The each of the different target learning images may be obtained by modifying a weight value of at least one layer from among a plurality of layers included in the at least one second artificial intelligence model.

Then, the weight value of the modified at least one layer may be obtained by multiplying a feature vector with the weight value of the at least one layer.

The first artificial intelligence model may be implemented as a Convolutional Neural Network (CNN), and the second artificial intelligence model may be implemented as a Generative Adversarial Network (GAN).

The specific style may be at least one from among a type of instrument, a type of emotion, or a processing method of an image.

The method 800 may further include dividing the audio signal into a plurality of sections of a predetermined length, and operation S810 may further include obtaining a plurality of images representing a frequency spectrum of each of a plurality of sections, and operation S820 may include inputting each of the plurality of images to the first artificial intelligence model, and the method 800 may further include obtaining a final image by stitching the images output from the first artificial intelligence model, and operation S830 may include obtaining the output audio signal based on the final image.

Operation S810 may include obtaining the image from the audio signal through the Fast Fourier Transformation (FFT), and operation S830 may include obtaining the output audio signal from the image output through the Inverse Fast Fourier Transformation (IFFT).

According to the various embodiments as described above, the electronic apparatus may use artificial intelligence models based on applying the audio signal to the artificial intelligence model by converting the image representing the frequency spectrum of the audio signal, and provide intuitiveness with respect to the audio signal processing.

According to an embodiment, various embodiments described above may be implemented as a software including instructions stored on a machine-readable storage media readable by a machine (e.g., computer). The machine, as an apparatus capable of calling an instruction stored in a storage medium and operating according to the called instruction, may include an electronic apparatus (e.g., electronic apparatus (A)) according to the disclosed embodiments. Based on instructions being executed by the processor, the processor may directly, or using other elements under the control of the processor, perform a function corresponding to the instruction. The instruction may include a code generated by a compiler or a code executable by an interpreter. The machine-readable storage medium may be provided in the form of a non-transitory storage medium. Herein, the 'non-transitory' storage medium may not include a signal and is tangible, but does not distinguish data being semi-permanently or temporarily stored in a storage medium.

According to an embodiment, the method according to various embodiments disclosed herein may be provided in a computer program product. The computer program product may be exchanged between a seller and a purchaser as a commodity. The computer program product may be distributed in the form of a machine-readable storage medium (e.g., compact disc read only memory (CD-ROM)) or distributed online through an application store (e.g., PlayStore™). In the case of on-line distribution, at least a portion of the computer program product may be at least temporarily stored in a storage medium such as a server of a manufacturer, a server of an application store, or a memory of a relay server, or temporarily generated.

In addition, according to an embodiment, various embodiments described above may be implemented in a computer or in a recording medium capable of reading a similar apparatus using a software, a hardware or a combination of software and hardware. In some cases, the embodiments described herein may be implemented as a processor itself. Based on a software implementation, the embodiments according to the process and function described in the disclosure may be implemented as separate software modules. Each of the software modules may perform one or more function or operations described in the disclosure.

The computer instructions for performing machine processing operations according to the various embodiments described above may be stored in a non-transitory computer-readable medium. The computer instructions stored in this non-transitory computer-readable medium may, when executed by the processor of a specific device, have a specific device perform the processing operation of a device according to the various embodiments described above. The non-transitory computer readable medium may refer, for example, to a medium that stores data semi-permanently, and is readable by an apparatus. Examples of a non-transitory computer-readable medium may include a compact disc (CD), a digital versatile disc (DVD), a hard disc, a Blu-ray disc, a universal serial bus (USB), a memory card, a read only memory (ROM), and the like.

In addition, each of the elements (e.g., a module or a program) according to the various embodiments described above may include a single entity or a plurality of entities, and some sub-elements from among the abovementioned sub-elements may be omitted, or another sub-element may be further included in various embodiments. Alternatively or additionally, some elements (e.g., modules or programs) may be integrated into one entity to perform the same or similar functions performed by each respective element prior to integration. The operations performed by a module, a program, or other element, in accordance with the various embodiments, may be performed sequentially, in a parallel, repetitively, or in a heuristically manner, or at least some operations may be performed in a different order, omitted, or may further include a different operations.

While various embodiments have been illustrated and described with reference to various figures, the disclosure is not limited to specific embodiments or the drawings, and it will be understood by those of ordinary skill in the art that various changes in form and details may be made therein without departing from the spirit and scope as defined.

What is claimed is:

1. An electronic apparatus, comprising:
   a memory configured to store a trained first artificial intelligence model; and a processor connected to the memory and configured to:
  based on receiving an input audio signal, divide the input audio signal into a plurality of sections having a predetermined length, obtain a plurality of input frequency spectrum images representing a plurality of frequency spectrums corresponding to the plurality of sections,
  input the plurality of input frequency spectrum images to the trained first artificial intelligence model,
  obtain a plurality of output frequency spectrum images from the trained first artificial intelligence model,
  obtain a final output image by stitching the plurality of output frequency spectrum images, and
  obtain an output audio signal based on the final output image,
  wherein the first artificial intelligence model is trained based on a target learning image, and
  wherein the target learning image represents a target frequency spectrum of a specific style, and is obtained from a trained second artificial intelligence model based on a random value and a condition value corresponding to the specific style, and
  wherein the second artificial intelligence model is trained to obtain a plurality of target learning images representing a plurality of target frequency spectrums of a plurality of styles based on a plurality of condition values corresponding to the plurality of styles.

2. The electronic apparatus of claim 1, wherein the memory is further configured to store a plurality of first artificial intelligence models,
  wherein the plurality of first artificial intelligence models are trained based on different target learning images, and
  wherein the different target learning images are obtained from the second artificial intelligence model.

3. The electronic apparatus of claim 2, wherein the different target learning images are obtained by modifying a weight value of at least one layer from among a plurality of layers included in the second artificial intelligence model.

4. The electronic apparatus of claim 3, wherein the modified weight value is obtained by multiplying a feature vector with the weight value of the at least one layer.

5. The electronic apparatus of claim 1, wherein the first artificial intelligence model comprises a Convolutional Neural Network (CNN), and
  wherein the second artificial intelligence model comprises a Generative Adversarial Network (GAN).

6. The electronic apparatus of claim 1, wherein the specific style is classified according to at least one from among a type of instrument, a type of emotion, or a processing method of an image.

7. The electronic apparatus of claim 1, wherein the processor is further configured to:
  obtain the plurality of input frequency spectrum images from the input audio signal using a Fast Fourier Transformation (FFT), and
  obtain the output audio signal from the plurality of output frequency spectrum images using an Inverse Fast Fourier Transformation (IFFT).

8. A control method of an electronic apparatus, the method comprising:
  based on receiving an input audio signal, dividing the input audio signal into a plurality of sections having a predetermined length, obtaining a plurality of input frequency spectrum images representing a plurality of frequency spectrums corresponding to the plurality of sections;
  inputting the plurality of input frequency spectrum images to a trained first artificial intelligence model stored in the electronic apparatus;
  obtaining a plurality of output frequency spectrum images from the trained first artificial intelligence model;
  obtaining a final output image by stitching the plurality of output frequency spectrum images; and
  obtaining an output audio signal based on the final output image,
  wherein the first artificial intelligence model is trained based on a target learning image, and
  wherein the target learning image represents a target frequency spectrum of a specific style, and is obtained from a trained second artificial intelligence model based on a random value and a condition value corresponding to the specific style, and
  wherein the second artificial intelligence model is trained to obtain a plurality of target learning images representing a plurality of target frequency spectrums of a plurality of styles based on a plurality of condition values corresponding to the plurality of styles.

9. The control method of claim 8, wherein the electronic apparatus stores a plurality of first artificial intelligence models,
  wherein the plurality of first artificial intelligence models are trained based on different target learning images, and
  wherein the different target learning images are obtained from the second artificial intelligence model.

10. The control method of claim 9, wherein the different target learning images are obtained by modifying a weight value of at least one layer from among a plurality of layers included in the second artificial intelligence model.

11. The control method of claim 10, wherein the modified weight value is obtained by multiplying a feature vector with the weight value of the at least one layer.

12. The control method of claim 8, wherein the first artificial intelligence model comprises a Convolutional Neural Network (CNN), and
  wherein the second artificial intelligence model comprises a Generative Adversarial Network (GAN).

13. The control method of claim 8, wherein the specific style is classified according to at least one from among a type of instrument, a type of emotion, or a processing method of an image.

14. The control method of claim 8, further comprising:
  obtaining the plurality of input frequency spectrum images from the input audio signal using a Fast Fourier Transformation (FFT); and
  obtaining the output audio signal from the plurality of output frequency spectrum images using an Inverse Fast Fourier Transformation (IFFT).

15. A non-transitory computer-readable recording medium configured to store instructions which, when executed by at least one processor of an electronic apparatus, cause the at least one processor to:
  based on receiving an input audio signal, divide the input audio signal into a plurality of sections having a predetermined length, obtain a plurality of input frequency spectrum images representing a plurality of frequency spectrums corresponding to the plurality of sections;
  input the plurality of input frequency spectrum images to a first trained artificial intelligence model stored in the electronic apparatus;
  obtain a plurality of output frequency spectrum images from the trained first artificial intelligence model;

obtain a final output image by stitching the plurality of output frequency spectrum images; and obtain an output audio signal based on the final output image, wherein the first artificial intelligence model is trained based on a target learning image, wherein the target learning image represents a target frequency spectrum of a specific style, and is obtained from a trained second artificial intelligence model based on a random value and a condition value corresponding to the specific style, and wherein the second artificial intelligence model is trained to obtain a plurality of target learning images representing a plurality of target frequency spectrums of a plurality of styles based on a plurality of condition values corresponding to the plurality of styles.

16. The non-transitory computer-readable medium of claim 15, wherein the first artificial intelligence model comprises a Convolutional Neural Network (CNN), and wherein the second artificial intelligence model comprises a Generative Adversarial Network (GAN).

\* \* \* \* \*